3,234,002
HERBICIDAL COMPOSITION AND METHOD
Mark B. Weed, Wilmington, Del., assignor to E. I. du Pont de Nemours and Company, Wilmington, Del., a corporation of Delaware
No Drawing. Filed July 19, 1962, Ser. No. 211,088
5 Claims. (Cl. 71—2.6)

This application is a continuation-in-part of copending application Serial No. 21,114, filed April 6, 1960, which in turn is a continuation-in-part of applications Serial Nos. 718,146, filed February 28, 1958; 570,433, filed March 9, 1956; and 505,520, filed May 2, 1955, all now abandoned.

This invention relates to herbicidal compositions. It is more particularly directed to compositions containing herbicidally effective amounts of:

A substituted urea selected from the group consisting of fenuron, monuron, diuron and the same in which one methyl group is replaced with a methoxy group; and A polychloropropionic acid compound selected from the group consisting of 2,2-dichloropropionic acid, 2,2,3-trichloropropionic acid, and their sodium, potassium ammonium, methylammonium, dimethylammonium, trimethylammonium, and ethylene diammonium salts.

I have found that it is characteristic of mixtures of herbicidal polychloropropionic acid compounds with herbicidal aryl alkyl urea compounds to produce combinations which are more effective as weed killers than either herbicide used alone. The result is that the combination has enhanced herbicidal effectiveness in the destruction and prevention of weeds. By the word "prevention" I include soil sterilization.

This enhanced effectiveness is particularly surprising in the case of rhizomatous weeds inasmuch as the combination gives total kill of such weed pests whereas neither herbicide when applied singly gives total kill of such weeds. By the term "rhizomatous weeds," I mean broadleaf and grass weeds which can spread vegetatively.

The polychloropropionic acid compounds used in the compositions and methods of this invention are characterized by the following formula:

(1) 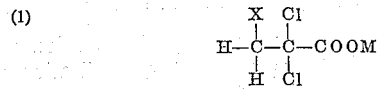

where:

M is selected from the group consisting of hydrogen, and alkali metal, ammonium, methylammonium, dimethylammonium, trimethylammonium, and ethylene diammonium ions, and X is selected from the group consisting of hydrogen and chlorine.

In ethylene diammonium salts, the mole ratio of polychloropropionic acid to ethylene diamine can be either 1:1 or 2:1.

The substituted ureas which can be used are 1-phenyl-3,3-dimethylurea (fenuron), 1(p-chlorophenyl)-3,3-dimethylurea (monuron), 1-(3,4-dichlorophenyl)-3,3-dimethylurea (diuron) and the same substituted ureas in which one methyl group is replaced with a methoxy group. Thus in addition to the compounds named there can be used 1-phenyl-3-methyl-3-methoxyurea, 1-p-chlorophenyl-3-methyl-3-methoxyurea, and 1-(3,4-dichlorophenyl)-3-methyl-3-methoxyurea.

The ratio of substituted urea:chloropropionic acid compound can range from about 3:1 to 1:20 for both soil sterilization and pre-emergence usage. Preferably the ratio is from 1:1 to 1:3.

It is much preferred to formulate the active components of the invention, comprising a herbicidal polyhalopropionic acid compound and a herbicidal aryl alkyl urea compound, with conventional pest control adjuvants, modifiers or diluents, hereinafter called inert carriers because handling is facilitated and herbicidal action is thereby frequently enhanced. Such herbicidal compositions or formulations are prepared in the form of powdered solids or liquids.

These compositions, whether solutions, emulsions, dispersions of the active components in a liquid solvent, or wettable powders, contain as a conditioning agent one or more surface-active agents in amount sufficient to render a given composition containing the active component readily dispersible in water or in oil. By the term "surface-active agent" it is understood that wetting agents, dispersing agents, suspending agents and emulsifying agents are included.

Suitable surface-active agents are set out, for example, in Searle U.S.P. No. 2,426,417; Todd U.S.P. No. 2,655,447; Jones U.S.P. No. 2,412,510; or Lenher U.S.P. No. 2,139,376. A detailed list of such agents is set forth in "Detergents and Emulsifiers . . . Up-to-date," 1961, by J. W. McCutcheon, Inc., and Bulletin E–607 of the Bureau of Entomology and Plant Quarantine of the U.S. Department of Agriculture. In preparing these herbicidal compositions, surface-active agents will generally be employed at concentrations of from about 1% to 10%, by weight. Levels as high as 0.25 to 6 parts for each part of the total herbicides present, however, give unusual and unexpected beneficial results. Such compositions have a greater herbicidal effectiveness than can be expected from a consideration of the activity of the components used separately.

Powdered or dust compositions of the invention, whether or not also modified with a surface-active agent, are prepared by mixing the active compounds of the invention with finely-divided inert carriers. Such carriers are preferably talc, natural clays, synthetic fine silica or calcium silicate, pyrophillite, diatomaceous earth and flours such as walnut shell, wheat, soya bean, redwood and cotton seed flours. Other inert solids which can be used are sulfur, calcium sulfate, etc., either in powder or granular form. The percentage, by weight, of active components in the solid compositions will vary according to the manner in which the compositions are to be applied, but in general, will be from about 0.1 to 95, percent, by weight.

Herbicidal compositions can also be prepared by dispersing the active components in an inert nonaqueous carrier. Aliphatic and aromatic hydrocarbons, for example, hydrocarbons of petroleum origin, are preferred as carriers. These dispersions are prepared by milling the active ingredients with dispersing agents, suspending agents and inert carriers, in mills such as pebble mills. The amount of herbicide in such dispersions can range from 10 percent or less to 40 or even 50 percent by weight.

Adhesives such as gelatin and albumin, and resins such as rosin, alkyd resins and the like, can also be used in the compositions to increase the tenacity of deposits following application.

In general, the herbicidal compositions as applied in the form of a spray will contain from about 0.2 percent to 95 percent by weight of the combined herbicidally active components.

Compositions of this invention can be prepared in various ways as follows:

Wettable powders are prepared by combining in a blender the two active components in the desired ratio, adding a fluffing diluent as a grinding aid together with a wetting agent to assure easy preparation of an aqueous suspension and also a dispersing agent to prevent flocculation in water. These components are blended together, then passed through a hammer mill or other suitable grinding device until the particle size is substantially below 50 microns. The product is then reblended until homogenous.

Aqueous dispersions are prepared by mixing the active components, a dispersing agent and a suspending agent with water and grinding in a pebble mill or sand mill until the individual particles are substantially all below 5 microns.

Oil dispersions are prepared in substantially the same way as aqueous dispersions, but in this case the dispersing agent chosen is also an emulsifier for the oil so that the final product can be diluted with water to form a spray emulsion.

Pellets are prepared by blending the finely-ground actives with a binding clay, and if rapid disintegration in water is desired, also a readily soluble salt. The blend is then moistened with 10 to 20 percent water and then extruded from a die under high pressure to yield a compact pellet.

Granules are prepared by spraying an aqueous suspension-solution of the two active components upon a granular diluent such as granular attapulgite, while tumbling the latter to obtain uniform deposition. Alternatively, graules may also be prepared from mixtures such as described for pellets above, by mixing with larger amounts of water and forming in a commercial granulator such as the Stokes granulator and drying the product.

Dusts are most frequently prepared by diluting wettable powders with a dense, rapid settling diluent such as micaceous talc by blending the two together in a ribbon or cone blender. Alternatively, where wetting or dispersing agents are undesirable, the active components are first mixed with a minor amount of a fluffing diluent such as a grinding aid, micropulverized and then blended with the dense major diluent.

The herbicidal composition can be applied either as a spray or dust to the locus or area to be protected from weeds. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as foliar sprays, but can also be applied as sprays directly to the soil. Alternatively, the dry powdered compositions can be dusted directly on the plants or on the soil. For some purposes, as in the treatment of ponds or lake bottoms, it will be convenient to use the pellet form of the compositions.

The compositions of the invention are, of course, applied in amount sufficient to exert the desired herbicidal action. The rate of application for destroying or preventing weeds will vary with the particular weed pest involved, the formulation used, the herbicidal activity of the active ingredients, the purposes for which the application is being made (such as for either short-term or long-term control), the manner of application, plant density, prevailing weather conditions and like variables. Since many variables play a role, it is not possible to indicate generally one rate of application suitable for all situations.

In general, however, the rate of application of active components of the invention when mixed with each other in the proportions above-indicated and formulated with inert carriers will range from about 0.5 to 60 pounds per acre of active components. When used for soil sterilization purposes, the amount of the urea applied will range from about 5 to 60 pounds per acre while the amount of the acid applied will range from about 5 to 40 pounds per acre. When the compositions are used for pre-emergence purposes the amount of urea used will range from about 0.5 to 4.0 pounds per acre and the amount of polychloropropionic acid applied will range from about 0.5 to 8.0 pounds per acre.

For certain uses the combinations of this invention demonstrate greatly enhanced herbicidal effectiveness. Rates of application that are generally found effective in these situations can be indicated, but it must be remembered that the determination of the proper rate in any given instance is conventional procedure to those skilled in the art. Thus, for example, the combinations of this invention are outstandingly useful in controlling rhizomatous weeds. For instance, industrial sites are often infested with mixed weed populations which include sheep sorrel, quack grass, Johnson grass, nutgrass, Bermuda grass, blue grass and annual weeds including pigweed, crab grass, foxtail (Setaria spp.) and other mixed weeds. When such infestations are sprayed with the combinations of this invention, long-lasting weed control is obtained. When such areas are treated with either polychloropropionic acid alone or with substituted ureas alone, applied at equivalent rates, rhizomatous weeds such as quack grass, Bermuda grass, nutgrass, Johnson grass and sheep sorrel are not killed. Yet when the two herbicidally active compounds are applied together such rhizomatous weed pests are killed.

These mixtures give especially effective control of Setaria spp. (foxtail) grasses when used as a combination pre-post-emergence treatment on soil of at least about 10 pounds per acre.

These mixtures are also useful for controlling rhizomatous weeds in agricultural crop lands. The combinations are applied in the fall to the weed-infested area. Approximately 7 to 10 days after application the soil is plowed or disked. Excellent control of weeds is maintained during the winter and spring seasons. The rhizomatous weed population is considerably reduced in this crop field so treated the following season.

Pre-emergence application and directed post-emergence treatments using these compositions are also useful to kill weeds in agricultural crop fields. Rates of application in pre-emergence use depend upon the desired effect. For example, lower rates of application ranging from about 0.5 to 4.0 pounds per acre of herbicidal urea and about 0.5 to 8.0 pounds per acre of polychloropropionic acid are generally sufficient for pre-emergence application.

Application rates of from about 5 to 60 pounds per acre of substituted aryl alkyl urea and from about 5 to 40 pounds per acre of the polychloropropionic acid compounds are generally sufficient for vegetation control.

In order that the invention can be better understood the following examples are given in addition to the examples already given above. The examples illustrate typical herbicidal compositions of the invention, methods for their preparation, herbicidal applications and results obtained. The numbers following the tabulated ingredients represent parts by weight of the ingredients within the respective compositions.

*Example 1.—Water dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having a particle size of less than about 50 microns.

A.

| | Percent |
|---|---|
| 2,2-dichloropropionic acid, Na salt | 70 |
| Monuron | 3.5 |
| Alkyl naphthalene sulfonic acid | 0.25 |
| Sodium lignin sulfonate | 0.50 |
| Attapulgite | 25.75 |

B.

| | |
|---|---|
| 2,2-dichloropropionic acid, dimethylamine salt | 50.0 |
| Diuron | 12.5 |
| Sodium "Lorol" sulfate | 0.5 |
| Methylcellulose, low viscosity | 0.2 |
| Diatomaceous silica | 36.8 |

C.

| | |
|---|---|
| 2,2-dichloropropionic acid, K salt | 70 |
| Fenuron | 15 |
| Alkyl naphthalene sulfonic acid | 0.5 |
| Synthetic calcium silicate from diatomaceous silica ("Celite" 800) | 14.3 |

D.

| | |
|---|---|
| 2,2,3-trichloropropionic acid, Na salt | 70 |
| Diuron | 3.5 |
| Alkyl naphthalene sulfonic acid, Na salt | 0.25 |
| Sodium lignin sulfonate | 0.50 |
| Attapulgite | 25.75 |

E.

| | |
|---|---|
| 2,2,3-trichloropropionic acid, ethylene diammonium salt | 50 |
| Diuron | 12.5 |
| Alkyl naphthalene sulfonic acid, Na salt | 0.5 |
| Sodium lignin sulfonate | 0.20 |
| Attapulgite | 36.8 |

When 5 pounds of any one of the above formulations is added to and mixed with 100 gallons of water in a spray tank, and resulting mixture is applied at a volume such that a rate of 20 pounds per acre of active components is applied, mixed weed infestations containing rhizomatous weeds are completely killed.

Example 2.—Oil-water dispersible powders

The following powdered compositions are adapted for use in the preparation of spray compositions using either as oil, water or a combination of oil and water as the liquid diluent. The powders are made by mixing and grinding as in the case of the powders of Example 1.

A.

| | Percent |
|---|---|
| 2,2-dichloropropionic acid, ammonium salt | 30 |
| Diuron | 7 |
| Polyoxyethylene sorbitol ester of mixed fatty and resin acids | 4 |
| Synthetic calcium silicate from diatomaceous silica ("Celite" 800) | 59 |

B.

| | |
|---|---|
| 2,2-dichloropropionic acid | 30 |
| 1-p-chlorophenyl-3-methyl-3-methoxyurea | 7 |
| Aryl alkyl polyether alcohol | 5 |
| Finely-divided synthetic silica ("Hi-Sil") | 58 |

These formulations at rates of 50 pounds per acre active give excellent control of mature stands of mixed weed infestations surrounding industrial sites. Such weeds as Johnson grass, nutsedge, blue grass, goldenrod, oxeye daisy, sheep sorrel and foxtail are controlled.

Example 3.—Water-dispersible liquid composition

The following composition is in a liquid form and is adapted for addition to water to give an aqueous emulsion for application as a spray.

| | Percent |
|---|---|
| 2,2-dichloropropionic acid methylammonium salt | 50 |
| Monuron | 10 |
| Alkyl aryl polyether alcohol | 5 |
| Aromatic herbicidal oil | 35 |

On addition to water, the above composition emulsifies; then a propionic acid compound, which is particularly water-soluble distributes between the aqueous and oil phases while the urea remains dispersed in the oil phase.

This formulation at 60 pounds per acre active can be used to obtain soil sterilization with thoroughly satisfactory results.

Example 4.—Dust formulations

The following compositions are adapted for direct application as dusts for the prevention or destruction of weeds using conventional dusting equipment. The dusts are made by blending or mixing the active ingredients in minor diluent, then grinding the mix and subsequently blending with the major diluent to give free-flowing compositions.

A.

| | Percent |
|---|---|
| 2,2-dichloropropionic acid, Na salt | 20 |
| Diuron | 5 |
| Attapulgite | 25 |
| Pyrophillite | 50 |

B.

| | |
|---|---|
| 2,2-dichloropropionic acid, diethylamine salt | 30 |
| Monuron | 1.5 |
| "Celite" 209 | 30 |
| Micaceous talc | 38.5 |

Example 5.—Pellet formulations

The following compositions are prepared in pellet form by the method previously described earlier in the specification.

| | Percent |
|---|---|
| Fenuron | 15 |
| 2,2-dichloropropionic acid, Na salt | 25 |
| Clay | 59 |
| Oleoyl ester of Na isethionate | 1 |

This formulation is used at 50 pounds per acre active for control of scrub oak and annual and perennial grasses along a fire break.

Example 6

Five pounds of the formulation containing 80% monuron, 1.75% of an alkyl naphthalene sulfonate, 0.25% methylcellulose (15 cps.) and 17.2% fuller's earth; and 20 pounds of sodium 2,2-dichloropropionate are added to 100 gallons of water in a spray tank. This mixture is applied at a volume of 100 gallons per acre to a railroad ballast which is infested with annual and perennial weeds. Almost complete control is obtained of all the vegetation in the area, and the site remains bare for an extended period.

When quick-kill of vegetation is desired, 12 pounds of a surfactant such as polyoxyethylenethioether can be added to give excellent contact action on crab grass, blue grass, water grass, foxtail, sheep sorrel and seedling Johnson grass.

Example 7

Five pounds of the formulation containing 80% diuron, 1.75% of an alkyl naphthalene sulfonate, 0.25% methylcellulose (15 cps.), and 17.2% fuller's earth; and 20 pounds sodium 2,2-dichloropropionate are added to 100 gallons of water in a spray tank. The mixture is applied at a volume of 100 gallons per acre to a ditch bank which is infested with annual and perennial weeds. Almost complete control is obtained of all the vegetation in the sprayed area.

Example 8

Ten pounds of a formulation containing 80% fenuron, 1.75% of an alkyl naphthalene sulfonate, 0.25% methylcellulose (15 cps.), and 17.2% fuller's earth; and 20 pounds sodium 2,2-dichloropropionate are added to 100 gallons of water in a spray tank. This mixture is applied at a volume of 100 gallons per acre around a lumber yard which is infested with annual and perennial weeds. Almost complete control is obtained of the vegetation present in the area and the site remained substantially bare for an extended period.

Example 9

Two pounds of the formulation containing 80% monuron, 1.75% of alkyl naphthalene sulfonate, 0.25% methylcellulose (15 cps.) and 17.2% fuller's earth; and four pounds of sodium 2,2-dichloropropionate are added to 40 gallons of water in a spray tank. This mixture is applied at a volume of 40 gallons per acre as a directed post-emergence treatment for weed control on sugar cane. The sugar cane grows satisfactorily and good weed control is obtained.

The addition of six pounds of trimethylnonylether of polyethylene glycol to this tank mixture gives excellent contact (quick-kill) control of such weeds as crab grass, water grass, foxtail, seedling Johnson grass, blue grass, lamb's quarters and pigweed.

Example 10

Ten pounds of the formulation containing 80% monuron, 1.75% of an alkyl naphthalene sulfonate, 0.25% methylcellulose (15 cps.), 0.8% $Na_2HPO_4$ and 17.2% fuller's earth; and 20 pounds of sodium 2,2-dichloropropionate are added to 100 gallons of water in a spray tank. This mixture is applied at a volume of 100 gallons per acre to an area heavily infested with Johnson grass seedlings. Almost complete control is obtained of all vegetation present and the area remains free of Johnson grass and other vegetation for an extended period.

Example 11

One and one-half pounds of a formulation containing 80% monuron, 1.75% of an alkyl naphthalene sulfonate, 0.25% methylcellulose (15 cps.) and 17.2% fuller's earth and 10 pounds of sodium 2,2-dichloropropionate and 0.4 pound of an alkyl naphthalene sulfonate are added to 100 gallons of water in a spray tank. This mixture is applied in the spring at a volume of 200 gallons per acre to an agricultural crop which is heavily infested with established Johnson grass and other annual and perennial weeds. Four weeks after this treatment all of the original vegetation appears to be completely eradicated from the area.

Several weeks after application, corn and cotton are planted and they grow and mature normally without competition from a heavy growth of weeds.

Example 12

A mixture containing 2 pounds of monuron and 12 pounds of 2,2-dichloropropionic acid, sodium salt is applied in 100 gallons of water to foliage containing an infestation of quack grass, Johnson grass, blue grass, nutsedge, broomsedge and various rhizomatous weeds. These active agents are formulated as shown in Example 1A.

After one week the soil is plowed. The following spring corn is planted and a marked reduction in the rhizomatous weed population is noted. Due to this reduced infestation of these rhizomatous weeds, a good yield of corn is harvested.

In Examples 1B, 1E, 4A, 7 and 9, 1-(3,4-dichlorophenyl)-3-methyl-3-methoxyurea can be used in place of diuron to give similar results.

In Examples 1A, 3 and 10, 1-p-chlorophenyl-3-methyl-3-methoxyurea can be used in place of monuron to give similar results.

In examples 1C, 5 and 8, 1-phenyl-3-methyl-3-methoxyurea can be used in place of fenuron to give similar results.

The embodiments of the invention in which an exclusive property or privilege is claimed are:

1. A herbicidal composition comprising a herbicidally effective amount of a mixture of:
    a substituted urea selected from the group consisting of 1-phenyl-3,3-dimethylurea, 1-(p-chlorophenyl)-3,3-dimethylurea, 1-(3,4-dichlorophenyl)-3,3-dimethylurea, 1-phenyl-3-methyl-3-methoxyurea, 1-p-chlorophenyl-3-methyl-3-methoxyurea, and 1-(3,4-dichlorophenyl)-3-methyl-3-methoxyurea; and
    a polychloropropionic acid compound selected from the group consisting of 2,2-dichloropropionic acid, 2,2,3-trichloropropionic acid, and their sodium, potassium, ammonium, methylammonium, dimethylammonium, trimethylammonium, and ethylene diammonium salts,
the ratio of substituted urea:polychloropropionic acid being from 3:1 to 1:20.

2. A herbicidal composition comprising a herbicidally effective amount of a mixture of:
    a substituted urea selected from the group consisting of 1-phenyl-3,3-dimethylurea, 1-(p-chlorophenyl)-3,3-dimethylurea, 1-(3,4-dichlorophenyl)-3,3-dimethylurea, 1-phenyl-3-methyl-3-methoxyurea, 1-p-chlorophenyl-3-methyl-3-methoxyurea, and 1-(3,4-dichlorophenyl)-3-methyl-3-methoxyurea; and
    a polychloropropionic acid compound selected from the group consisting of 2,2-dichloropropionic acid, 2,2,3-trichloropropionic acid, and their sodium, potassium, ammonium, methylammonium, dimethylammonium, trimethylammonium, and ethylene diammonium salts,
together with from .25 to 6 parts of a surface-active agent for each part of the total amount of herbicides present the ratio of substituted urea:polychloropropionic acid being from 3:1 to 1:20.

3. A method for the control of weeds which comprises applying to a locus to be protected a herbicidal composition comprising a herbicidally effective amount of a mixture of:
    a substituted urea selected from the group consisting of 1-phenyl-3,3-dimethylurea, 1-(p-chlorophenyl)-3,3-dimethylurea, 1-(3,4-dichlorophenyl)-3,3-dimethylurea, 1-phenyl-3-methyl-3-methoxyurea, 1-p-chlorophenyl-3-methyl-3-methoxyurea, and 1-(3,4-dichlorophenyl)-3-methyl-3-methoxyurea; and
    a polychloropropionic acid compound selected from the group consisting of 2,2-dichloropropionic acid, 2,2,3-trichloropropionic acid, and their sodium, potassium, ammonium, methylammonium, dimethylammonium, trimethylammonium, and ethylene diammonium salts,
the ratio of substituted urea:polychloropropionic acid being from 3:1 to 1:20.

4. A method for the control of weeds which comprises applying to a locus to be protected a herbicidal composition comprising a herbicidally effective amount of a mixture of:
    a substituted urea selected from the group consisting of 1-phenyl-3,3-dimethylurea, 1-(p-chlorophenyl)-3,3-dimethylurea, 1-(3,4-dichlorophenyl)-3,3-dimethylurea, 1-phenyl-3-methyl-3-methoxyurea, 1-p-chlorophenyl-3-methyl-3-methoxyurea, and 1-(3,4-dichlorophenyl)-3-methyl-3-methoxyurea; and
    a polychloropropionic acid compound selected from the group consisting of 2,2-dichloropropionic acid, 2,2,3-trichloropropionic acid, and their sodium, potassium, ammonium, methylammonium, dimethylammonium, trimethylammonium, and ethylene diammonium salts, together with from .25 to 6 parts of a surface-active agent for each part of the total amount of herbicides present the ratio of substituted urea:polychloropropionic acid being from 3:1 to 1:20.

5. A method for killing Johnson grass comprising applying to the locus of growth of said grass a herbicidally effective amount of a mixture comprising 3 to 1 parts by weight of 1-(p-chlorophenyl)-3,3-dimethylurea and 1 to 20 parts by weight of 2,2-dichloropropionic acid, sodium salt.

References Cited by the Examiner
UNITED STATES PATENTS

| | | | |
|---|---|---|---|
| 2,642,354 | 6/1953 | Barrons | 71—2.7 |
| 2,709,648 | 5/1955 | Ryker et al. | 71—2.6 |
| 2,807,530 | 9/1957 | Barrons | 71—2.7 |
| 2,960,534 | 11/1960 | Scherer et al. | 71—2.6 XR |
| 3,084,192 | 4/1963 | Smathers | 71—2.6 |
| 3,095,407 | 6/1963 | Brust | 71—2.6 X |
| 3,112,342 | 11/1963 | Luckenbaugh | 71—2.6 X |

LEWIS GOTTS, *Primary Examiner.*

IRVING MARCUS, *Examiner.*